Dec. 22, 1970 H. R. SHAW 3,550,130
PASSIVE DIRECTION FINDER
Filed Nov. 25, 1968 3 Sheets-Sheet 1

INVENTOR.
HUBERT R. SHAW

Richards, Harris & Hubbard
ATTORNEY

INVENTOR:

HUBERT R. SHAW

ATTORNEY

United States Patent Office 3,550,130
Patented Dec. 22, 1970

3,550,130
PASSIVE DIRECTION FINDER
Hubert R. Shaw, Fort Worth, Tex., assignor to Bell Aerospace Corporation, Hurst, Tex., a corporation of Delaware
Filed Nov. 25, 1968, Ser. No. 778,598
Int. Cl. G01s 3/52
U.S. Cl. 343—113                        15 Claims

ABSTRACT OF THE DISCLOSURE

A passive direction finder which utilizes the Doppler frequency shift produced by rotation of a helicopter rotor blade to determine the bearing to a non-cooperative radio transmitter or other source of electromagnetic radiation. The system employs two receiving antennas, one located on the rotor blade, preferably on the tip of the blade, and the other located on the fuselage of the helicopter. As the blade rotates, the frequency of the signal received on the blade antenna is shifted due to the Doppler effect; i.e., the frequency is increased as the antenna mounted on the blade moves toward the source of signal and decreased as the antenna moves away from the source of signal. Zero frequency shift occurs when the blade points to the same azimuth as the source of signal. A receiving system coupled to both antennas determines the instant at which zero frequency shift occurs by comparing the frequency of the signal received on the blade antenna with the frequency of the same signal received simultaneously on the antenna located on the fuselage. A pickoff on the rotor shaft continuously supplies the angular position of the rotor blade with respect to the longitudinal axis of the aircraft. At the instant zero frequency shift occurs, as determined by the receiving system, the blade angle is read out and by suitable processing provides the bearing to the source of signal with respect to the longitudinal axis of the aircraft.

BACKGROUND OF THE INVENTION

This invention relates to a passive direction finder and more particularly to a direction finder utilizing the Doppler effect to sense the direction to a non-cooperative radio transmitter or other source of electromagnetic energy.

Heretofore, the most generally used direction finding systems have determined the direction to a source of signal by positioning a loop receiving antenna to a null or near-null signal position. At low signal levels, the accuracy with which the null or near-null signal position can be determined is relatively poor, because of the poor signal-to-noise ratio around the null position. The accuracy of such a system is also impaired by signal reflections from metallic structures in the surrounding area. Since the direction sensing antenna is located on the fuselage of an aircraft, the signal received consists of the direct signal plus the reflected signals, most of which arrive at the loop antenna from a different direction than the desired signal. For helicopter mounted systems, reflections from the rotor blades are particularly detrimental.

An additional shortcoming of the null-position, loop-antenna, direction-finding system is the upper operating frequency limitation. As the operation frequency increases, the dimensions of the loop antenna must decrease thereby resulting in a reduction of received signal strength.

Also, the null-position, loop-antenna, direction-finding systems are considered to be too slow for some applications due to a relatively long reaction time. The reaction time of a loop system is the time required to position the loop to the null signal position, which must be readjusted as the aircraft moves or changes altitude.

In accordance with the present invention, an antenna is mounted on the tip of a helicopter rotor blade and, as the blade rotates, the signal distance between the antenna and a signal source varies in a manner such that a shift in frequency of the received signal takes place due to the Doppler effect. The Doppler frequency shift goes through zero when the blade points directly at the same azimuth as the source of signal at which time the antenna-to-source distance is at a minimum. The antenna is positioned on the blade tip in such a manner so as to provide maximum directional receptivity when the blade points at the source of signal, thus providing the most favorable signal-to-noise ratio. However, the Doppler frequency shift is independent of antenna orientation or directivity.

An omni-directional antenna mounted on the helicopter fuselage also receives a signal from the source of signal. This signal and the Doppler effect frequency shifted signal are processed in such a manner as to frequency modulate a locally generated reference signal; the direction information resides in this frequency modulation. Since the direction information resides in the frequency modulation, the signal may be amplitude-limited in the receiving equipment to remove the detrimental effects of amplitude noise.

The frequency modulated reference signal is compared with the unmodulated reference signal and when the frequency difference passes through zero, a marker generator produces a pulse. The marker generator in turn activates a readout of bearing as generated by a rotor shaft pick-off. The bearing indication is then displayed or suitably processed as required.

To determine the bearing of a source of radiation, it is an object of this invention to provide a passive direction finder. Another object of this invention is to provide a passive direction finder wherein the direction information resides in a frequency modulated reference signal, thereby permitting the removal of the detrimental effect of amplitude noise. A further object of this invention is to provide a passive direction finder having a favorable signal-to-noise ratio at the instant the bearing to a signal source is determined. Still another object of this invention is to provide a passive direction finder that operates with increased efficiency with increasing signal frequency due to the fact that the magnitude of the Doppler frequency shift increases directly with the operating frequency. An additional object of this invention is to provide a passive direction finder having a reaction time within the period of at the most one rotation of the receiving antenna.

SUMMARY OF THE INVENTION

In accordance with the present invention, there is provided a passive direction finder for determining the bearing of a source of electromagnetic radiation wherein a receiving antenna is mounted to rotate in a plane such that the distance between the antenna and the source signal varies in a manner to produce Doppler frequency modulation of the received signal. A second antenna is mounted in a fixed position and receives a signal from the source substantially as radiated. The Doppler shift produced by motion of an aircraft with respect to the signal source is of no importance because both antenna signals are equally affected thereby. A comparison of the signals from both antennae produces a bearing indication when both signals are at essentially the same frequency.

A more complete understanding of the invention and its advantages will be apparent from the specification and claims and from the accompanying drawings illustrative of the invention.

DESCRIPTION OF THE PREFERRED EMBODIMENT

Figure 1:
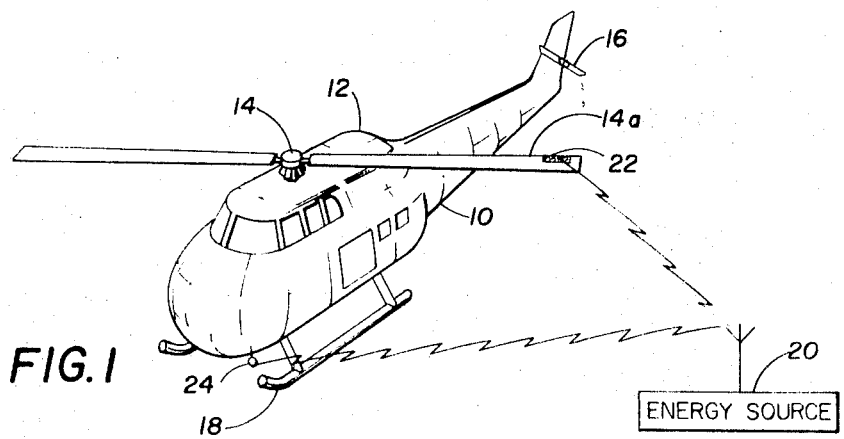
FIG. 1 schematically illustrates the use of the present invention in a helicopter to locate a non-cooperative transmitter.

With reference to FIG. 1, the two antennae for the passive direction finder of this invention are mounted to a helicopter which comprises an elongated fuselage or hull 10 having a pylon 12 comprising an engine and associated gearing required to rotate a lifting rotor 14 about a vertical axis. The tail portion includes an anti-torque rotor 16 in accordance with standard single rotor helicopter design. The skid-type landing gear 18 is provided for supporting the helicopter. Although the invention will be described with reference to a helicopter application, other aircraft or a fixed ground station may be equipped with the passive direction finder of the present invention.

According to the present invention, the bearing of any frequency stable continuous wave transmitter 20 may be determined with respect to the longitudinal axis of the helicopter by a system that includes a receiving blade antenna 22 mounted on the tip of the rotor blade 14a. A fixed antenna 24 is mounted on the fuselage 10 of the helicopter and may be either a "whip" or a combination of ferrite loops. Whereas, the blade antenna 22 produces a Doppler frequency modulated signal due to blade rotation, the fixed antenna 24 is omni-directional and receives a signal at a frequency which is essentially that of the signal source. Both antenna circuits are remotely tuned by means of varactor diodes (not illustrated).

As the helicopter blade 14 rotates to provide lift and thrust, the signal distance between the source of signal 20 and the blade antenna 22 varies in a cyclic manner. Any dynamic change in the distance between the source 20 and the blade antenna 22 produces a change in the frequency of the received signal. The frequency increases as the distance decreases and decreases as the distance increases. The magnitude of the frequency shift is proportional to the closing or receding velocity of the antenna 22 with respect to the source 20 relative to the speed of light. Since the antenna 22 rotates in a circle at a constant angular velocity, the relative velocity with respect to the source 20 varies sinusoidally and thus the frequency of the received signal varies sinusoidally.

The frequency shift will be at a maximum when the rotor blade 14 is at an angle or ±90 degrees to the source 20 and zero when the blade points directly at the signal transmitter or directly away from the source.

Assume the antenna 22 rotates in a plane coinciding with the plane of the energy source from the transmitter 20. Based on this assumption, the magnitude of the maximum frequency shift equals the tangential velocity of the blade antenna 22, divided by the speed of light, and multiplied by the operating frequency as given by the following equation:

$$F_s = V_t/C(F_o) \qquad (1)$$

where $V_t$ equals the tangential velocity of the blade antenna 22, C equals the speed of light, and $F_o$ represents the operating frequency.

As an example, a blade having a radius of 22 feet and rotating at 5.2 revolutions per second will impart a tangential velocity of 720 feet per second to the antenna 22 ($22 \times 2\pi \times 5.2 = 720$). The maximum frequency shift per mHz. is then:

$$F_s/\text{mHz.} = \frac{720}{982 \times 10^6} \times 10^6 = 0.73 \text{ Hz.} \qquad (2)$$

Accordingly, at an operating frequency of 2 mHz. the maximum frequency shift is 1.5 Hz., and an operating frequency of 10 mHz., the maximum frequency shift is 7.3 Hz. To determine the frequency shift for any position of the blade 14, the maximum frequency shift as given by Equation 1 is multiplied by the sine of the angle between the blade 14 and the bearing to the transmitter.

Typically, the blade antenna 22 may consist of a ferrite rod having a space-wound coil which is remotely tuned by a varactor diode connected directly across the coil. Many parameters affect the efficiency of the antenna 22, including the electrical characteristics of the ferrite material employed and the physical size of the antenna. The two most important electrical factors affecting the antenna efficiency are signal-capture and Q. Signal-capture is defined as the voltage induced in the antenna coil, expressed as a percentage of the field strength, and the antenna Q is the multiplication of the induced voltage by the tuned circuit at resonance. The product of signal-capture and the antenna Q is commonly designated as the efficiency. For an experimental system, the antenna had a signal-capture of 4.25% and a Q of 200. The efficiency of this antenna was thus 850%.

With respect to the fixed antenna 24, the radiation pattern must be such as to provide omni-directional coverage in azimuth and at the same time provide as much protection as possible against signal reflections from the rotor blade. A signal received by the fixed antenna 24 will have a frequency equal to substantially that transmitted by the source 20. The frequency shift at the fixed antenna 24 and the blade antenna 22, due to a dynamic change in distance from the aircraft to the transmitter 20, can be neglected since this shift will be substantially the same for both antennae.

Figure 2:
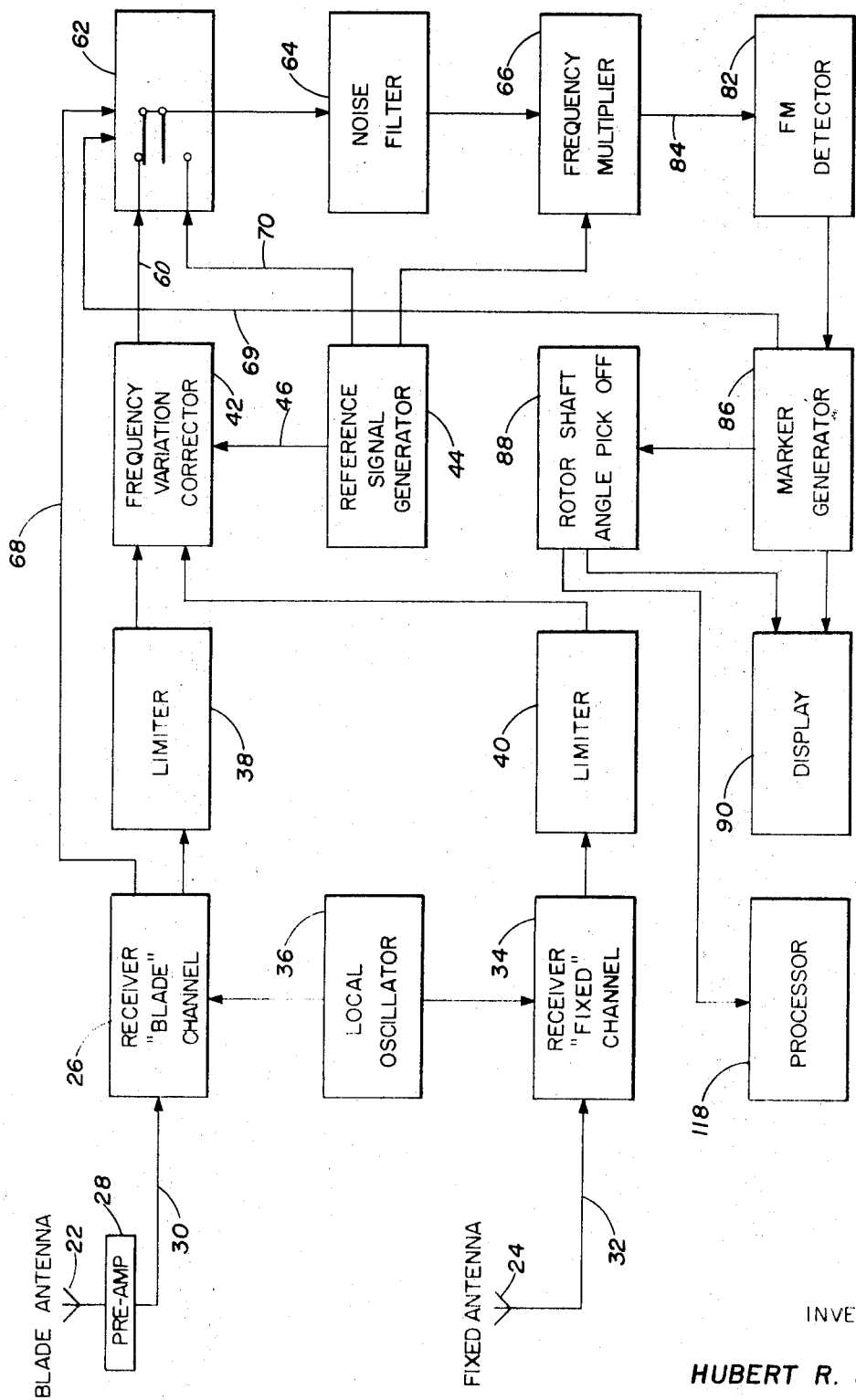
FIG. 2 is a block diagram of a passive Doppler direction finding system.

Referring to FIG. 2, there is shown a block diagram of a passive Doppler direction finding system in accordance with the present invention wherein the blade antenna 22 and the fixed antenna 24 are coupled to a dual channel superheterodyne receiver having a common local oscillator to provide that the two channels are at the same intermediate frequency. The blade antenna 22 is coupled to a receiver channel 26 through a transmission line 30 and an untuned preamplifier 28 of a conventional design. Because of the rotating coupling between the helicopter blade 14 and the pylon 12, the transmission line 30 includes slip rings and a rotary joint (not shown). The preamplifier 28 raises the level of the signal delivered by the blade antenna 22 in order to minimize the effect of any electrical interference which may be present as a weak signal passes down the transmission line 30, especially through the slip rings, to the receiver 26. Also, the relatively high impedance level of the signal delivered by the blade antenna 22 must be reduced to the relatively low characteristic impedance level of a standard transmission line. Typically, the preamplifier may consist of two emitter-follower stages followed by a transistor amplifier output stage feeding a 93-ohm transmission line. The effective input resistance of the amplifier is relatively high compared to the blade antenna circuit impedance. As a result, there is little if any loading of the antenna circuitry.

The fixed antenna 24 passes a signal through a transmission line 32 directly to a receiver channel 34 which may be similar to the receiver channel 26. The receiver channels 26 and 34 may be a standard radio frequency receiver. Although two separate receiver channels are shown, a dual channel receiver may be used.

For weak received signals, the IF signals from the receiver channels 26 and 34 may be amplitude modulated by noise. This amplitude modulation is removed by limiters 38 and 40 coupled to the outputs of the receivers 26 and 34, respectively. As an example of a limiter configuration, each may consist of an amplifier with negative feedback followed by a filter. By appropriately connecting diodes in the feedback loop of the amplifier no feedback signal will be present at very low signal levels. However, above a predetermined level the diodes conduct and feedback is present. Accordingly, the amplifier exhibits high gain characteristics before the diodes conduct and a progressively lower gain as an input signal increases above the diode conduction level, thereby maintaining a nearly constant output signal over a wide dynamic range.

Figure 3:
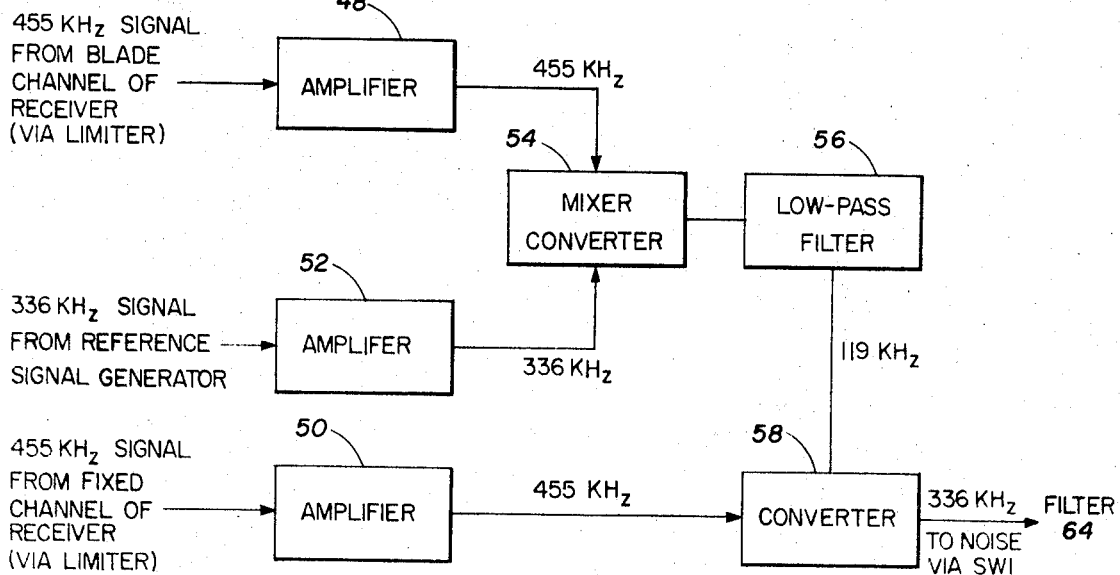
FIG. 3 is a block diagram of the frequency variation corrector of the system of FIG. 2.

The output signals from the limiters 38 and 40 are coupled to a frequency variation corrector 42 which functions to transfer the Doppler frequency modulation produced by the blade rotation to a stable reference signal. This transfer takes place regardless of variations in the frequency of the signal source and regardless of receiver tuning, provided only that a receiver output signal is present. The frequency variation corrector 42 is coupled to a stable continous wave reference signal generator 44 by means of a line 46. A block diagram of the frequency variation corrector 42 is shown in FIG. 3 and includes amplifiers 48, 50, and 52 having input terminals connected to the limiters 38 and 40 and the reference signal generator 44, respectively. A signal from the reference signal generator 44 and transmitted through the amplifier 52 is heterodyned in a mixer/convertor 54 with the IF signal from the receiver channel 26 as transmitted through the amplifier 48. The beat frequency signal from the mixer/convertor 54 passes through a low pass filter 56 which passes the beat frequency signal that equals the difference between the frequency of the reference signal generator and the IF signal from the receiver channel 26. The beat frequency signal from the low pass filter 56 is heterodyned in a convertor 58 with the IF signal from the receiver channel 34 as transmitted through the amplifier 50. The output of the convertor 58 is tuned to the difference frequency. If the two intermediate frequencies are identical, the frequency of the signal out of the convertor 58 is exactly the same as the reference signal. However, if the two intermediate frequencies are not identical, the frequency of the signal out of the convertor 58 is the reference signal frequency plus or minus the difference between the intermediate frequencies.

The two intermediate frequencies are identical when the Doppler frequency shift is zero. Although, the finite value of the intermediate frequencies depends on the tuning of the receiver relative to the received signal. As shown in FIG. 3, if the receiver channels 26 and 34 produce identical IF signals at 455 kHz. and the reference signal generator has an output at 336 kHz., the mixer/convertor 54 produces a beat frequency signal at 119 kHz., and the output of the convertor 58 will be 336 kHz. The output of the convertor 58 will likewise be 336 kHz. for any intermediate frequency other than 455 kHz.

However, if the two intermediate frequencies are not identical, as is the case when a Doppler frequency shift does exist, the operation is as follows:

Assume a frequency increase of 1 Hz. at the output of the amplifier 48 (455 kHz.+1 Hz.). A similar 1 Hz. frequency increase will appear at the output of the mixer/convertor 54 (119+1 Hz.) and a similar frequency difference will appear at the output of the convertor 58 although it will be of an opposite sign (336 kHz.−1 Hz.). The difference in the frequency at the output of the convertor 58 from the signal frequency of the reference generator 44 is the same as the change in frequency at the blade antenna 22. Thus, the Doppler frequency shift is transferred through the frequency variation corrector 42 and appears on a transmission line 60 coupled to a singlepole double-throw switch 62.

The output from the frequency variation corrector 42 passes through the switch 62 to a noise filter 64 which attenuates the noise components present at low received signal levels. Since noise appearing on the output of the system is inversely proportional to the square root of the overall system bandwidth, the overall bandwidth should be made as small as possible. Accordingly, overall system bandwidth is reduced to a lowest practical figure by means of the crystal noise filter 64 inserted between the switch 62 and a frequency multiplier 66.

In accordance with one well-known configuration, the switch 62 consists of two diode ring gates which are pulsed from conduction to non-conduction by the presence or absence of an IF signal from the receiver channel 26 on a line 68. During the presence of an IF signal on line 68 and the absence of a switching pulse on a line 69, as will be explained, the switch 62 is in the position shown and the frequency variation corrector output passes through the noise filter 64 to the frequency multiplier 66. During the absence of an IF signal on the line 68 or the presence of a timing signal on line 69, the switch 62 couples the reference signal generator output through the noise filter 64 to the frequency multiplier 66 by means of a line 70. Thus, a signal will be continuously passed through the noise filter 64 to the frequency multiplier 66.

Figure 4:
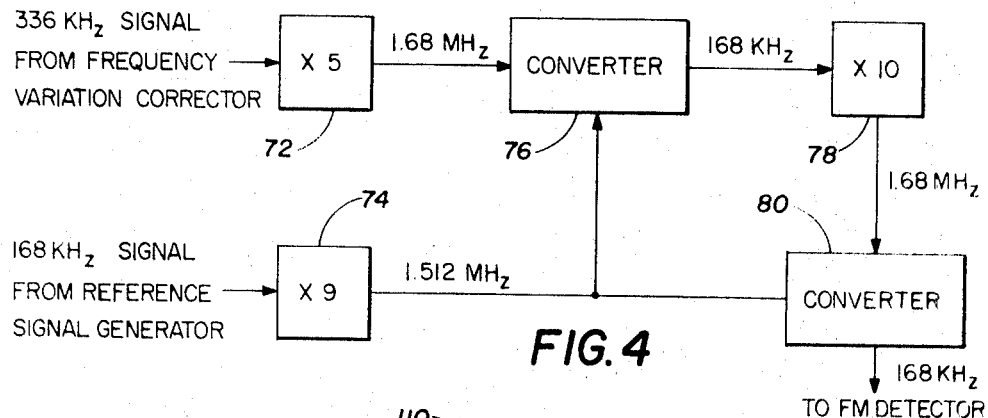
FIG. 4 is a block diagram of the frequency multiplier of the system of FIG. 2.

Inasmuch as the Doppler frequency shift at the antenna blade 22 is only a few Hz., a frequency multiplier is used to amplify the shift to a workable level. Referring to FIG. 4, there is shown a block diagram of a frequency multiplier including a 5× multiplier 72 and a 9× multiplier 74. A signal transmitted from the switch 62, via the noise filters 64, is multiplied by five in the 5× multiplier 72 and the frequency of the reference signal generator 44 is multiplied by nine in the 9× multiplier 74. These multiplied signals are heterodyned in a convertor 76 to yield a beat frequency which is multiplied in a 10× multiplier 78. The output of a 10× multiplier 78 and the 9× multiplier 74 are now heterodyned in a convertor 80 to effect a multiplication of 50 in the Doppler frequency shift present at the antenna blade 22. This multiplied frequency shift signal passes to a frequency detector 82 by means of a transmission line 84.

Assume the 5× multiplier 72 receives a 336 kHz. signal from the frequency variation corrector 42, and the 9× multiplier 74 receives a 168 kHz. signal from the reference signal generator 44. The converter 76 heterodynes a 1.68 mHz. signal from the multiplier 72 with a 1.512 mHz. signal from the multiplier 74 and produces a beat frequency of 168 kHz. This beat frequency is multiplied by 10 in the multiplier 78. The 1.68 mHz. signal from the multiplier 78 will be heterodyned with the 1.512 mHz. signal from the multiplier 74 to produce a 168 kHz. signal that is transmitted to the frequency detector 82. This detector is tuned to a center frequency of 168 kHz. and generates an output voltage which is almost linear over the maximum frequency range of the frequency multiplier output. For example, at 10 mHz. the maximum Doppler frequency shift is 7.5 hz., and with a multiplication factor of 50 for the multiplier 66, the input signal to the detector 82 varies ±375 Hz. around a center frequency of 168 kHz.

The detector 82 receives a signal at all times from the frequency multiplier 66. When the output of the receiver channel 26 is below a preset level or when a timing signal is present on line 69, the switch 62 transfers a signal from the reference signal generator 44 to the detector 82 through the frequency multiplier 66. When the detector 82 receives a signal from the reference signal generator 44, its output is a DC reference voltage, the magnitude of which approaches zero. When the signal at the output of the receiver channel 26 exceeds a threshold level and a timing signal is not present on line 69, the switch 62 couples the output of the frequency variation corrector 42 to the detector 82 through the multiplier 66. Under this condition, the output of the detector 82 is a voltage which varies about the DC reference voltage level as the blade approaches and recedes from directly pointing at the source 20.

Figure 5:
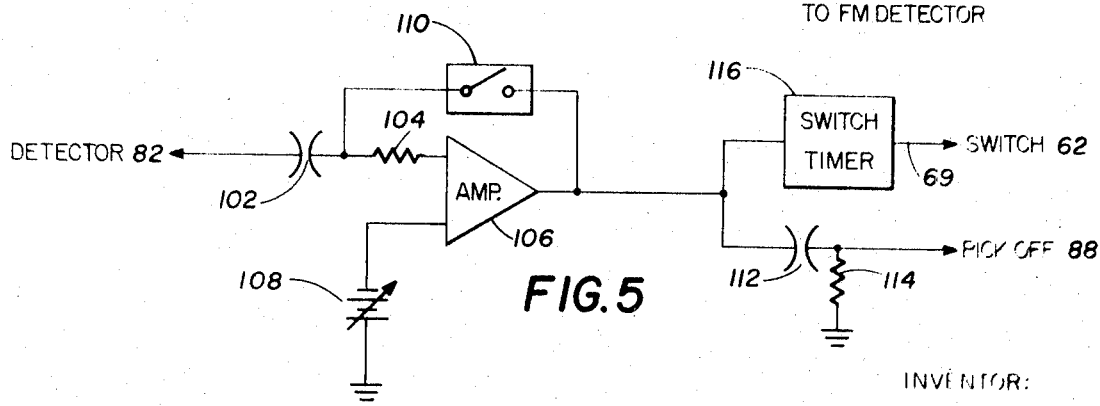
FIG. 5 is a schematic of a marker generator for the system of FIG. 2.

The voltage output signals from the detector 82 are coupled to a marker generator 86 which is basically a comparator. Referring to FIG. 5, there is illustrated a marker generator including a coupling capacitor 102 connected to the detector 82 and in series with a resistor 104 connected to one input of an operational amplifier 106. The second input to the operational amplifier 106 is tied to a bias voltage such as the battery 108. Connected between the output terminal of the amplifier 106 and the junction of the capacitor 102 and register 104 is a single-pole signal-throw switch 110 which may be ganged to operate in synchronism with the switch 62. Also connected to the output terminal of the amplifier 106 is a switch timer 116 and a RC circuit including a capacitor 112 and a resistor 114. The operational amplifier 106 may be of a conventional design having a very high gain, a small differential between the two input terminals drives the output signal to either of two saturation levels, depending upon the polarity of the differential.

In operation the switch 110 (a diode ring gate) will be closed whenever the reference signal generator 44 is connected to the detector 82 through the switch 62. Capacitor 102, being connected to the output of the detector 82, receives a charge until the output voltage of the amplifier 106 equals the bias voltage at the second input terminal. Thus, when the switch 110 is closed, the voltages at the two input terminals and the output terminal are all equal.

When the output of the receiver channel 26 exceeds a predetermined threshold level, the switch 62 changes to the position shown in FIG. 2 and the switch 110 opens. The capacitor 102 now acts as a bias voltage source and the signal at the first input to the operational amplifier 106 increases and decreases in accordance with the output voltage of the detector 82. Assume the output voltage of the detector 82 is increasing, the output of the operational amplifier 106 saturates at the upper saturation level. The output of the amplifier 106 stays at this upper saturated level until the output of the detector 82 reverses direction and decreases to a value less than the voltage on the capacitor 102. As the output of the detector 82 decreases to a value less than the bias voltage on the capacitor 102, the output of the operational amplifier 106 abruptly changes from the upper saturated level to the lower saturated level. This abrupt change in voltage when connected to the capacitor 112 and the resistor 114 produces a marker pulse to a rotor shaft position pick-off 88 and to the switch timer 116. The timer 116 in turn generates a timing signal to change the switch 62 to the line 70 and close the switch 110. The timer 116 holds the switch in a closed position for a period of time approximately equal to one-half a revolution of the rotor 14.

The pulse signal produced by the marker generator 86 to the rotor shaft pick-off 88 activates the pick-off which supplies shaft position for further processing, as desired, in a processor 118. In addition, the marker generator pulse also activates a display 90. Many different types of displays may be employed in the system illustrated depending on the desired readout. For example, an oscilloscope may be coupled to the position pick-off 88 and activated by a pulse from the marker generator 86. The rotor shaft position pick-off may be any one of several devices which generates a signal related to the angular position of the rotor with respect to the longitudinal axis of the helicopter. A pulse from the marker generator 86 activates the angle pick-off 88 to transfer the angular position of the rotor blade 14 to the display 90. Thus, the display 90 is a bearing indication to the energy source transmitter 20 with respect to a fixed reference which may be the longitudinal axis of a helicopter.

Figure 6:
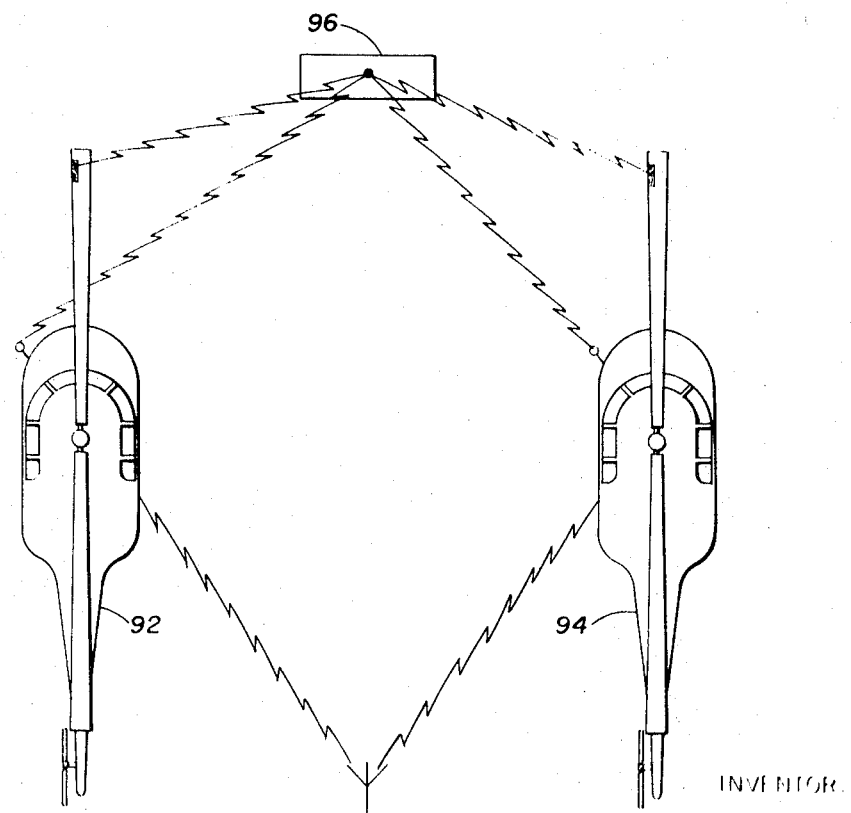
FIG. 6 illustrates schematically a method of locating a non-cooperative transmitter by means of triangulation using two passive direction finding stations.

To locate a source of electromagnetic radiation, two aircraft may be deployed each containing a passive Doppler effect direction finding system, as shown in FIG. 2, for triangulation purposes, as shown in FIG. 6. If two aircraft are deployed for triangulation purposes and their respective positions are accurately known, the bearing and range to an unknown source of electromagnetic radiation can be determined. Each of the aircraft 92 and 94 alternately determines the bearing to the unknown transmitter 96 with respect to the longitudinal axis of the individual aircraft and the bearing to a transmitter located in the other aircraft. The summation of these two angles yields the angle between the unknown transmitter 96 and the other aircraft. With this angle known for both aircraft, and the distance between the aircraft known, a triangle is completely defined and the position of the unknown transmitter 96 can be computed. As illustrated, the angle information may be transmitted to a computer 98 for purposes of the computations.

A geometric azimuth error may occur which is a function of the rotor disc attitude and the declination angle. Under normal conditions, this error is very small and can be neglected.

While only one embodiment of the invention, together with modifications thereof, has been described in detail herein and shown in the accompanying drawings, it will be evident that various further modifications are possible in the arrangement and construction of the components without departing from the scope of the invention.

What is claimed is:

1. A passive direction finder for determining the bearing of a source of electromagnetic radiation comprising:
   antenna means mounted to rotate in a plane such that the signal distance between said antenna means and said source varies in a manner to produce Doppler effect frequency modulation of the signal received from the source of electromagnetic radiation,
   second antenna means mounted in a fixed position for receiving a signal from said source,
   means for transferring the difference between the Doppler effect signal and the second antenna signal to a reference signal to thereby frequency modulate the reference signal,
   means for comparing the modulated reference signal with the unmodulated reference signal and generating a marker pulse when the frequencies of said signals are essentially equal, and
   means responsive to said marker pulse for generating a bearing with respect to a reference.

2. A passive direction finder for determining the bearing of a source of electromagnetic radiation as set forth in claim 1 wherein said means for generating the frequency modulated reference signal includes:
   means for heterodyning the signal from said first antenna with a reference signal to produce a selected beat frequency signal, and
   means for heterodyning a signal from said second antenna with said selected beat frequency signal to transfer the difference between the Doppler effect signal and the second antenna signal to the reference signal to thereby frequency modulate the reference signal.

3. A passive direction finder for determining the bearing of a source of electromagnetic radiation as set forth in claim 2 wherein said comparing means includes means for generating a voltage change proportional to the modulation of such referenec signal.

4. A passive direction finder for determining the bearing of a source of electromagnetic radiation from a helicopter which comprises:
   antenna means mounted to one of the rotor blades of said helicopter for cyclically varying the signal travel distance from said source to said antenna means to produce a Doppler modulated receive signal,
   second antenna means mounted in a fixed position on said helicopter for receiving said signal from said source without the Doppler modulation,
   means for frequency modulating a reference signal by transferring to the reference signal the frequency difference between the Doppler modulated signal and the second antenna signal, means for generating a first voltage proportional to the unmodulated reference signal and a second voltage varying in accordance with the modulated reference signal, and means for comparing said voltage signal to generate a bearing indication when both antenna signals are essentially the same frequency.

5. A passive direction finder for determining the bearing of a source of electromagnetic radiation from a helicopter as set forth in claim 4 wherein said comparing means includes a rotor position pick-off to indicate the position of the helicopter rotor when said antenna signals are at essentially the same frequency.

6. The method of determining the bearing of a source of electromagnetic radiation comprising:
producing Doppler effect frequency modulation of a signal received from the source of electromagnetic radiation by means of an antenna mounted to rotate in a plane such that the signal distance between said antenna means and said source varies in a cyclic manner,
producing a second signal at a frequency of the signal received from the source of electromagnetic radiation by means of a second antenna mounted in a fixed position,
generating a frequency modulated reference signal by transferring to a reference signal the difference between the Doppler effect signal and said second signal, and
generating a bearing indication when the frequency of the modulated reference signal and the reference frequency are essentially equal.

7. The method of determining the bearing of a source of electromagnetic radiation as set forth in claim 6 including the step of determining said bearing indication with respect to a reference.

8. A passive direction finder for determining the bearing of a source of electromagnetic radiation comprising:
receiving antenna means mounted to rotate in a plane such that the signal distance between said antenna means and said source varies in a manner to produce Doppler effect frequency modulation of the signal received from the source of electromagnetic radiation,
second antenna means mounted in a fixed position for receiving a signal from said source, and
means for generating a bearing for said source with respect to a reference location by comparison of a reference signal with the same reference signal frequency modulated by the difference between the Doppler effect frequency modulations and the second antenna signal.

9. A passive direction finder for determining the bearing of a source of electromagnetic radiation as set forth in claim 8 wherein said means for generating a bearing inculde means for converting the reference signal into a D.C. voltage and the modulated reference signal into a D.C. voltage that varies about the reference D.C. voltage level.

10. A passive direction finder for determining the bearing from a helicopter to a source of electromagnetic radiation which comprises:
first receiving means for receiving a signal from said source mounted on a rotary element of said helicopter for cyclically varying the signal travel distance to said receiving means to produce a Doppler modulated received signal,
second receiving means carried by said helicopter for also receiving a signal from said source,
means for transferring the differences betwen the Doppler effect signal and the second received signal to a reference signal to thereby frequency modulate the reference signal, and
means for determining the bearing of said source by comparing the modulated reference signal with the unmodulated reference signal to determine when the frequencies of said signals are essentially equal.

11. A passive direction finder for determining the bearing from a helicopter to a source of electromagnetic radiation as set forth in claim 10 wherein said means for transferring the difference between the Doppler effect signal and the second received signal to a reference signal includes a first convertor for mixing the reference signal with the Doppler effect signal into a first convertor frequency, and means for converting the output of the first convertor by mixing with the signal from the second receiving means to produce a frequency modulated reference signal.

12. A passive direction finder for determining the bearing from a helicopter to a source of electromagnetic radiation as set forth in claim 11 wherein said means for determining a bearing by a comparison of the modulated reference signal with the unmodulated reference signal includes means for generating a rotor position when the frequencies of said signals are essentially equal.

13. A method of determining the location of a source of electromagnetic raditaion by triangulation between two passive direction finder stations which comprises:
generating Doppler effect frequency modulation of a signal received from the source of electromagnetic radiation at each of said direction finder stations,
generating a second signal at a frequency of the signal from the source of electromagnetic radiation at each of said direction finder stations,
generating a bearing indication at each of the direction finder stations by comparing the Doppler effect signal at each station with the second signal at each station,
generating a signal at each of the direction finder stations proportional to the angle between the bearing indication and the opposite finder station, and
combining the signals generated in said last two steps into a source bearing indication.

14. A method of determining the location of a source of electromagnetic radiation as set forth in claim 13 wherein the step of generating a bearing indication at each of the direction finder stations includes the step of transferring the difference between the Doppler effect frequency modulation signal and the second antenna signal to a reference signal to thereby frequency modulate the reference signal.

15. A method of determining the location of a source of electromagnetic radiation as set forth in claim 14 wherein the step of generating a bearing indication at each of the direction finder stations further includes the step of comparing the modulated reference signal with the unmodulated reference signal to determine bearing when the frequencies of said signals are essentially equal.

References Cited

UNITED STATES PATENTS

| | | |
|---|---|---|
| 2,762,043 | 9/1956 | Earp. |
| 3,144,646 | 8/1964 | Breithaupt. |
| 3,438,036 | 4/1969 | Bennett _____ 343—113 |

RODNEY D. BENNETT, JR., Primary Examiner

R. E. BERGER, Assistant Examiner

U.S. Cl. X.R.

343—112